(12) United States Patent
Qin et al.

(10) Patent No.: US 8,527,272 B2
(45) Date of Patent: Sep. 3, 2013

(54) METHOD AND APPARATUS FOR ALIGNING TEXTS

(75) Inventors: Yong Qin, Beijing (CN); Qin Shi, Beijing (CN); Zhiwei Shuang, Beijing (CN); Shi Lei Zhang, Beijing (CN); Jie Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 12/869,921

(22) Filed: Aug. 27, 2010

(65) Prior Publication Data
US 2011/0054901 A1    Mar. 3, 2011

(30) Foreign Application Priority Data
Aug. 28, 2009    (CN) .......................... 2009 1 0168621

(51) Int. Cl.
*G10L 15/04* (2006.01)

(52) U.S. Cl.
USPC .......................................................... 704/254

(58) Field of Classification Search
USPC .......................................................... 704/254
See application file for complete search history.

(56) References Cited

U.S. PATENT DOCUMENTS

| | | | | |
|---|---|---|---|---|
| 5,649,060 A | * | 7/1997 | Ellozy et al. | 704/278 |
| 5,684,925 A | * | 11/1997 | Morin et al. | 704/254 |
| 5,822,728 A | * | 10/1998 | Applebaum et al. | 704/254 |
| 6,172,675 B1 | * | 1/2001 | Ahmad et al. | 715/251 |
| 6,434,520 B1 | * | 8/2002 | Kanevsky et al. | 704/243 |
| 6,636,238 B1 | | 10/2003 | Amir et al. | |
| 7,219,056 B2 | | 5/2007 | Axelrod et al. | |
| 7,310,600 B1 | * | 12/2007 | Garner et al. | 704/234 |
| 8,131,545 B1 | * | 3/2012 | Moreno et al. | 704/235 |
| 8,185,375 B1 | * | 5/2012 | Kumar et al. | 704/4 |
| 8,275,604 B2 | * | 9/2012 | Jiang et al. | 704/4 |
| 2002/0116196 A1 | * | 8/2002 | Tran | 704/270 |
| 2006/0206324 A1 | * | 9/2006 | Skilling et al. | 704/231 |
| 2007/0156843 A1 | * | 7/2007 | Sagen et al. | 709/217 |
| 2008/0097754 A1 | | 4/2008 | Goto et al. | |
| 2008/0294433 A1 | | 11/2008 | Yeung et al. | |
| 2010/0138213 A1 | * | 6/2010 | Bicici et al. | 704/4 |

FOREIGN PATENT DOCUMENTS

CN    1773606 A     5/2006
WO    WO 01/95631 A2    12/2001

OTHER PUBLICATIONS

Och et al., A Systematic Comparison of Various Statistical Alignment Models, 2003, Association for Computational Linguistics, vol. 29, No. 1, pp. 19-51.*
URLhttp://infos2008.fci.cu.edu.eg/infos/MM_02_P006-012.pdf.
URL.http://www.speech.kth.se/~matsb/speech_rec_course_2003/papers/Per_Anders_J/speech_recognition_project_jande2.pdf.
Chinese Application No. 200910168621.X, Chinese Office Action, Oct. 15, 2012, 6 pages.

* cited by examiner

*Primary Examiner* — Jakieda Jackson
(74) *Attorney, Agent, or Firm* — Gibb & Riley, LLC

(57) ABSTRACT

A method and apparatus for aligning texts. The method includes acquiring a target text and a reference text and aligning the target text and the reference text at word level based on phoneme similarity. The method can be applied to automatically archiving a multimedia resource and a method of automatically searching a multimedia resource.

24 Claims, 9 Drawing Sheets

| | | 英 | 超 | 刚 | 才 | 咱 | 们 | 说 | 呢 |
|---|---|---|---|---|---|---|---|---|---|
| | 0 | 8 | 8 | 8 | 8 | 8 | 8 | 8 | 8 |
| 印 | 8 | 0.156948 | 12.1895 | 8.79941 | 12.9332 | 7.61164 | 7.2473 | 12.513 | 12.1347 |
| 钞 | 8 | 12.2641 | 0 | 7.2785 | 5.73979 | 8.53993 | 13.2215 | 3.45343 | 10.7047 |
| 票 | 8 | 9.01673 | 4.91325 | 6.75432 | 10.2814 | 9.22393 | 14.9088 | 4.41578 | 13.0178 |
| 还 | 8 | 13.2488 | 7.58795 | 8.5201 | 3.80963 | 8.26303 | 12.2813 | 9.13013 | 11.4504 |
| 这 | 8 | 9.88058 | 6.28007 | 4.7815 | 6.29711 | 3.67079 | 11.1796 | 4.32844 | 6.42509 |
| 么 | 8 | 11.4858 | 9.86199 | 7.16403 | 11.081 | 9.66706 | 4.86992 | 10.4935 | 2.71939 |
| 印 | 8 | 0.156948 | 12.1895 | 8.79941 | 12.9332 | 7.61164 | 7.2473 | 12.513 | 12.1347 |
| 呢 | 8 | 12.2618 | 10.7047 | 7.85353 | 11.9213 | 10.227 | 7.58931 | 11.862 | 0 |
| 这 | 8 | 9.88058 | 6.28007 | 4.7815 | 6.29711 | 3.67079 | 11.1796 | 4.32844 | 6.42509 |
| 个 | 8 | 10.4975 | 8.21275 | 2.48076 | 9.26051 | 5.63327 | 9.55319 | 6.51927 | 5.37277 |

Fig. 4a

|    | 0 | T     | AX   |
|----|---|-------|------|
| 0  | 0 | 8     | 8    |
| S  | 8 | 4.58  | 7.79 |
| AH | 8 | 10.23 | 2.07 |
| M  | 8 | 7.71  | 3.14 |

Fig. 5a

|    | 0   | T      | AX     |
|----|-----|--------|--------|
| 0  | 0   | -8     | -16    |
| S  | -8  | -4.58  | -12.58 |
| AH | -16 | -12.58 | -6.65  |
| M  | -24 | -20.58 | -14.65 |

Fig. 5b

|  |  | they | drive | some | of | the | core |
|---|---|---|---|---|---|---|---|
|  | 0 | 8 | 8 | 8 | 8 | 8 | 8 |
| they | 8 | 0 | 5.20 | 5.43 | 7.45 | 1.98 | 4.27 |
| trying | 8 | 5.33 | 3.32 | 5.31 | 6.45 | 5.56 | 4.59 |
| to | 8 | 1.51 | 5.03 | 4.88 | 7.85 | 1.75 | 3.33 |
| sum | 8 | 5.43 | 4.85 | 0 | 3.80963 | 4.11 | 2.74 |
| up | 8 | 8.41 | 6.47 | 5.26 | 3.77 | 8 | 5.53 |
| the | 8 | 1.98 | 4.77 | 4.11 | 8 | 0 | 3.35 |
| court | 8 | 5.20 | 4.25 | 4.06 | 5.66 | 4.51 | 2 |

Fig. 5c

|  | they | drive | Some | of | the | core |
|---|---|---|---|---|---|---|
|  | 0 |  |  |  |  |  |
| they |  | 0 |  |  |  |  |
| trying |  | -3.32 |  |  |  |  |
| to |  | -11.32 |  |  |  |  |
| sum |  |  |  | -11.32 |  |  |
| up |  |  |  |  | -15.09 |  |
| the |  |  |  |  | -15.09 |  |
| court |  |  |  |  |  | -17.09 |

Fig. 5d

METHOD AND APPARATUS FOR ALIGNING TEXTS

CROSS REFERENCE TO RELATED APPLICATION

This application claims priority under 35 U.S.C. 119 from Chinese Patent Application 200910168621.X, filed Aug. 28, 2009, the entire contents of which are incorporated herein by reference.

BACKGROUND OF THE INVENTION

1. Field of the Invention

The present invention relates to the field of speech processing technology, and in particular, relates to a method and apparatus for aligning texts, a method for automatically archiving multimedia resources, and a method for automatically searching multimedia resources.

2. Description of Related Art

At present, with the development of information technology, the size of repository for storing multimedia resources has become more and more bulky. For example, in news agency and television stations, there are normally voluminous broadcast news resources typically including program videos and broadcast manuscripts that need to be queried and managed. These historic program videos are typically not integrated with metadata for querying contents and thus are inconvenient for query and management. However, broadcast manuscripts which are in text form provide a natural interface for querying program videos because the contents therein are easy to query.

Manual query and management of these broadcast news resources is time and energy consuming and is often impossible. Thus, it is desirable to enable automatic alignment between program videos and broadcast transcripts. It is further desirable to enable automatic integration of program videos and broadcasts into a search-friendly multimedia resource. It is desirable that a search engine can automatically search a broadcast manuscript for a word or phrase to be queried and play back the queried content from a video file aligned to the broadcast manuscript.

For another example, currently, video or audio is often recorded during a meeting or a speech. These meeting minutes in video/audio form may be saved on a server for future browsing. A manuscript used in a meeting or speech, for example, a PPT (Powerpoint) manuscript, provides a natural interface for browsing the meeting minutes. In the case of browsing the manuscript while playing back the meeting minutes, it is required to synchronize the textual content in the manuscript and speech content in the meeting minutes in video/audio form.

Current methods must first predict the corresponding video/audio and reference text pairs, then use a speech recognition engine to decode audio data, and get the recognition result. Dynamic programming algorithm is used to make the character maximum match in order to realize sentence level alignment. These methods are affected by the recognition rate and accuracy of the reference text. In the case of low recognition rate or error existing in the reference text, the alignment effect is poor, or even worse, the alignment result might not be output. Besides, these methods cannot get accurate time information.

There are still other methods in the prior art which use a phoneme-based forced alignment to align voice in the video/audio and the reference text. However, these methods, affected by the precision of sentence level alignment, maybe cannot output the alignment result; and on the other hand, a reference document containing error also restrains alignment effect. Additionally, the forced alignment method is based on a phoneme-based acoustic model, which has a considerable calculation load. Detailed content on forced alignment is found, for example, in E. F. Lussier, "A Tutorial on Pronunciation Modeling for Large Vocabulary Speech Recognition". Lecture Notes in Computer Science, 2003, 2705: 38-77.

U.S. Pat. No. 5,649,060A1, "Automatic Indexing and Aligning of Audio and Text Using Speech Recognition", discloses a method, wherein a speech recognition result is produced through a speech recognizer, and then time information is transmitted to a correct text through aligning the recognition result and the correct text, thereby realizing automatic edition and search of audios. However, this method realizes alignment mainly through sameness of words, thus its alignment effect greatly relies on the speech recognition effect, and this method cannot be applied to aligning audio and error-containing reference text.

United States patent application publication No. US2008294433A1 provides a text-speech mapping tool, This method is accomplished by using a VAD (Voice Activity Detection) to obtain a candidate sentence ending point, then obtaining the best match between an audio and the sentence through forced alignment, and then aligning a next sentence, and so forth, to obtain all mapping relationships, thereby finally realizing word level alignment. As mentioned above, the forced alignment is based on an acoustic model, which requires a considerable calculation load and has a poor alignment effect under a complex context.

The paper "Automatic Align between Speech Records and Their Text Transcriptions for Audio Archive Indexing and Searching", INFOS2008, Mar. 27-29, 2008 Cairo-Egypt, by Jan Nouza, et al, discloses a method, wherein an associated language model associated is first obtained through a text, and then a recognition result Hi with a relatively better quality is obtained through the language model, and further a standard text is divided into small segments through the method of text alignment, and then the segments which have not been accurately aligned are subject to forced alignment to obtain a best alignment result. The alignment effect is determined by the recognition result of an Automatic Speech Recognition (ASR) system, and forced alignment requires a considerable calculation load.

For programs such as xiangsheng (Chinese traditional crosstalk) or talk show, their languages are quite free with many accents, and thus their speech recognition effect is quite poor. The current alignment methods based on similarity of words are likely impossible to align programs and reference texts (for example, a xiangsheng manuscript or a play), and even impossible to output an alignment result. On the other hand, the calculation load for the method based on forced alignment may be considerable, because under this circumstance, it is hard to accurately segment sentences, while forced alignment for a longer speech segment requires a more considerable calculation load.

Therefore, it is desirable for an efficient method for aligning video/audio and reference text, which can quickly achieve a better alignment result for a lower accurate recognition result and an error-containing reference text.

SUMMARY OF THE INVENTION

According to one aspect of the present invention, a method for aligning texts, includes the steps of acquiring a target text and a reference text, and aligning the target text and the reference text at word level based on phoneme similarity.

According to another aspect of the present invention, apparatus for aligning texts, includes an input module for acquiring a target text and a reference text, and a word alignment module for aligning the target text and the reference text at word level based on phoneme similarity.

According to a further aspect of the present invention, a method for archiving a multimedia resource, includes the steps of: acquiring an original multimedia resource and a reference text; recognizing speech data in the original multimedia resource to generate a target text; aligning the target text and the reference text at word level based on phoneme similarity; establishing a temporal link between the speech and the reference text based on alignment of the target text and the reference text; and adding the temporal link to the original multimedia resource to generate a new multimedia resource archive file.

According to a still further aspect of the present invention, a method for searching a multimedia resource, wherein the multimedia resource comprises speech data and its reference text, includes the steps of acquiring a key word for search, and acquiring a multimedia resource. The multimedia resource includes a reference text and a target text obtained through recognizing speech data in the multimedia resource, and, the reference text and the target arrre aligned at word level based on phoneme similarity. The multimedia resource also includes a temporal link established between the reference text and the speech data based on the alignment. The method includes the further steps of searching and identifying the key word in the reference text, and locating the part of the multimedia resource corresponding to the key word in the multimedia resource based on the location of the identified key word in the reference text and based on the temporal link.

BRIEF DESCRIPTION OF THE DRAWINGS

The above and other features of the present invention will become more apparent through the following detailed description of the preferred embodiments of the present invention with reference to the accompanying drawings. In the drawings:

FIG. 4a shows a pronunciation similarity table for words in a reference text and in a target text according to a preferred embodiment of the present invention;

FIG. 5a shows a pronunciation similarity table for phonemes of two English words;

FIG. 5b shows a DTW algorithm for a best phoneme matching path for two English words;

FIG. 5c shows a phoneme similarity table for words in a reference text and in a target text according to another preferred embodiment of the present invention;

FIG. 5d shows a DTW algorithm for seeking a best matching path between a reference text and a target text according to another preferred embodiment of the present invention;

In all of the above drawings, like reference signs indicate same, similar or corresponding features or functions.

DETAILED DESCRIPTION OF THE PREFERRED EMBODIMENTS

In light of the fact that a considerable number of errors occurring during the speech recognition process are homonyms or words with similar pronunciations, the present invention proposes aligning recognition text of speech data and reference text through phoneme similarity with phoneme as primitives. In this way, the alignment effect may be less affected by speech recognition errors or errors in a reference text. The solution as provided in the present invention does not use forced alignment. For a certain language family, phoneme similarity can be calculated and stored in advance, thus in the alignment algorithm as provided by the present invention, phoneme similarity may be directly used, thereby reducing calculation complexity.

In addition, the present invention further provides a hierarchical alignment manner. First, based on a perplexity rules, a whole text is segmented into a plurality of paragraphs. Next, alternatively, anchors are determined through matching successive word strings, and then the paragraphs are segmented into smaller segments based on the anchors. And then, on the basis of segments, a recognition text of speech data and a reference text are aligned through phoneme similarity. Thereby, a longer document may be processed, the alignment algorithm is further simplified, and the alignment speed is expedited.

Hereinafter, a method and apparatus for aligning speech data according to the present invention are described in detail through preferred embodiments with reference to the drawings.

Figure 1:
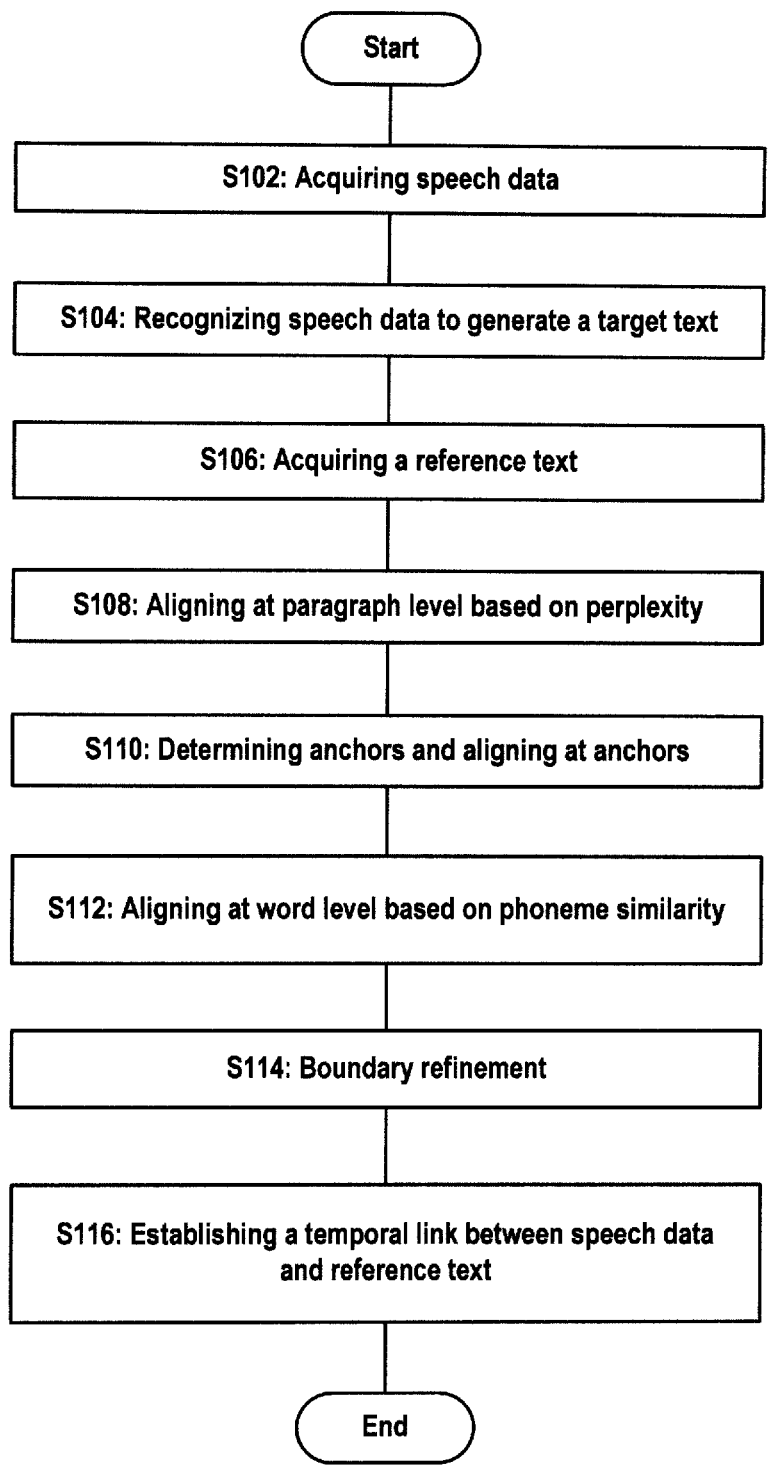
FIG. 1 schematically shows a flow chart of a method for aligning a target text and a reference text according to a preferred embodiment of the present invention.

FIG. 1 shows a flow chart of a method for aligning a target text and a reference text according to an exemplary embodiment of the present invention. Hereinafter, a method according to the present invention is illustrated with xiangsheng (traditional Chinese crosstalk) as an example.

At step S102, speech data is acquired, for example, acquiring a section of xiangsheng audio from a server. In the present description, speech data not only refer to speech data in the narrow sense, but also may include any audio or video data of speech data in a broader sense, which, for example, may be a movie, a TV program, a news broadcast, or vide/audio minutes of a meeting, etc. A recognized text of speech data may be a recognized text generated by recognizing speech data with any prior art. In addition, the audio or video data in the present invention is not limited to any particular storage format.

At step S104, speech recognition is performed to speed data, and the resulting recognized text for the speech data is taken as a target text. For example, by performing automatic speech recognition (ASR) to an acquired xiangsheng audio, a recognition text of the xiangsheng is generated.

It should be understood that steps of S102 and S104 for acquiring speech data and recognizing speech data are not essential to the method according to the present invention.

Currently, there are several kinds of automatic speech recognition software or services that may provide the recognition text of a speech. Thus, the recognition text of a speech may be obtained directly from automatic speech recognition software or service, i.e., a target text may be directly acquired from a server or other device. At step S106, a reference text corresponding to the speech data is acquired from a server or other device, for example, a xiangsheng manuscript of the xiangsheng is acquired from a server. In the present description, a reference text refers to a manuscript corresponding to speech data, which may be, for example, a caption of a movie, a manuscript of a news broadcast, or a PPT presentation used at a meeting. In addition, a reference document according to the present invention is not limited to any particular storage format.

In the present invention, many recognition errors can be allowed in the target text. Thus, a better alignment effect can be achieved even in the case of a relatively higher character error rate (CER). For example, in the present embodiment, the CER in the recognition result as obtained using a conventional ASR is relatively high due to many dialects or idiosyncratic language habits. Even in such condition, the alignment method according to the present invention can also achieve a better alignment result.

On the other hand, a reference document may also be an incomplete manuscript or can be allowed to contain some errors, which will not seriously affect the final alignment effect.

Next, at step S108, the target text and the reference text are aligned at paragraph level based on the perplexity rules. The target text may be roughly divided into individual sentences through any known art, for example the Voice Activity Detection (VAD). And then, based on the perplexity rules, individual sentences are mapped to different paragraphs, thereby dividing the target text into paragraphs corresponding to the paragraphs in the reference text. It is described in more detail with reference to FIG. 2 hereinafter.

It should be understood that after the paragraphs are aligned, the alignment based on phoneme similarity as described hereinafter may be performed on the basis of paragraph. It will greatly simplify the phoneme similarity-based alignment algorithm and expedite the alignment speed. Such hierarchical method according to the present invention facilitates processing a long document. However, step S108 is not essential. For a shorter text, it might not be segmented into paragraphs, while the whole text can be processed as a paragraph.

At step S110, continuous word string matching is performed to the target text and reference text so as to determine anchors. An anchor refers to a totally matching word string in the target text and reference text acquired by performing the continuous word string matching. It can be regarded that these anchors indicate an accurate alignment result with a high reliability. Based on an anchor, the preceding and following parts thereby may be segmented into different segments. Thus, a paragraph is segmented into different segments on the basis of the result of performing step S106.

The phoneme similarity-based alignment as described hereinafter may be performed on the basis of a segment shorter in length than a paragraph. It will further simplify the phoneme similarity-based alignment algorithm and expedite the alignment speed. The continuous word string matching may be performed in an order of long to short, so as to find totally matching word strings. For example, matched 10-word-long word strings may be first sought, then 9-word-long word strings, then 8-word-long word strings, and so forth. The totally matching word strings as found are used as anchors. Based on the anchors, the paragraphs of the target text are segmented into segments, thereby performing subsequent accurate alignment for each segment.

It should be noted that the sequence of shown steps is only exemplary, and the shown steps may be implemented by other sequence. For example, step S110 may also precede step S108. When step S110 precedes step S108, continuous word string matching may be performed to the whole text of the target text and of the reference text. In addition, under this circumstance, it is still possible to adjust the segmentation of paragraphs based on anchors. If a word string in a sentence at the end of a paragraph in the target text completely matches a word string in a sentence at the start of a next paragraph of the reference text (i.e., the word may act as an anchor), the sentence in the target text may be mapped to the next paragraph to redefine the paragraph boundary. When step S110 is after step S108, the continuous word string matching may be performed to the whole text of the target text and of the reference text, or the continuous word string matching is performed respectively to each paragraph.

Moreover, it should be understood that step S110 is not essential, because looking for anchors is just for further reducing the length of the text required to be aligned, so as to further improve the alignment speed and accuracy.

At step S112, the target text and the reference text are aligned at word level based on the phoneme similarity. In contrast from the method of realizing alignment through sameness of words in the prior art, the present invention realizes word-level alignment of the target text and reference text based on same or similarity of phonemes. It should be understood that the present invention may be applied to various kinds of languages, thus the term "word" in the present invention is not limited to a Chinese character in Chinese language, but refers to a basic element of any language, for example, a word in English.

It should be understood that phoneme is the minimum unit in a phonetic system of a language. Different languages or dialects have different phoneme systems. For example, Chinese and English have different phoneme systems, so do the Northeast dialect and Shanghai dialect. The numbers of phonemes in phoneme systems of different languages are greatly different. Some may have dozens, while some may have more than one hundred, but they are finite numbers. In respective language, similarities between phonemes are in contrast. For the sake of simplicity, they can be categorized as similarity and dissimilarity. It may be prescribed, during aligning a target text and a reference text, to try best to align same or similar phonemes while not aligning dissimilar phonemes.

For example, in Chinese pinyin, the phoneme "ING" is similar to the phoneme "IN", but dissimilar to the phoneme "AO". The method according to the present invention proposes aligning similar phonemes or words with similar phoneme based on phoneme similarity. For example, the pronunciation of the Chinese character "英" is similar to that of "印", but they are different Chinese characters. During speech recognition, "英" is very likely to be mistakenly recognized as "印". In this case, the prior art method of realizing alignment through same words cannot obtain an alignment result, because "英" and "印" are different words. With the method according to the present invention, "英"" may be aligned with "印". An exemplary alignment method according to the present invention is briefly described with reference text "英"" and target text "印".. First, each Chinese character is split into two phonemes based on its pinyin, for example, an initial consonant part and a vowel part (for a Chinese character with dual vowels, it may be split into two parts using known corresponding techniques). Pinyin for the Chinese character "英" is "YING". which may be decomposed into two phonemes, "Y" and "ING". Pinyin for the Chinese character "印" is "YIN". which may be decomposed into two phonemes, "Y" and "IN". Then the similarities of the phonemes of the two Chinese characters are compared. If two phonemes of the two Chinese characters are identical or similar respectively, it is deemed that the phonemes of the two Chinese characters are similar; otherwise it is deemed that the phonemes of the two Chinese characters are dissimilar. In this example, their initial phonemes "Y" are identical. Their second phonemes "IN" and "ING" are not identical, but similar. Thus, it may be deemed that the phonemes of the two Chinese characters "英" and "印" are similar. Finally, the reference text and the recognition text are aligned based on the phoneme similarity. For example, "英" and "印" are aligned based on the similarity of their phonemes.

For example, in English, the target text and the reference text may be likewise aligned based on phoneme similarity, which will be illustrated through a specific example.

They drive 00 some of the core computer science and software research areas
They trying to sum up the court computer science and software research area The upper line is the target text, while the lower line is the reference text. It is seen that there are many errors in the target text, in particular, "trying to sum up the court" is recognized as "drive 00 some of the core" (00 indicates silence or mute), wherein there are 5 word errors in 6 words. In this case, the prior art method of realizing alignment through sameness of words cannot achieve a sound alignment effect, even cannot output an alignment result. However, with the method according to the present invention, alignment may be achieved at word level based on the phoneme similarity, as shown in the above. For example, the phonemes corresponding to the words "some" and "sum" are all
 [s ʌ m]
Since the three phonemes are all identical, the words "some" and "sum" may be aligned based on phoneme sameness. For another example, the phonemes corresponding to the words "drive" and "trying" are
 [dr ai v]
and
 [tr ai η]
respectively, wherein their initial phonemes
 [dr]
and
 [tr]
are similar and their second phonemes
 [ai]
are identical. In the case that most phonemes corresponding to two words are identical or similar, respectively, it can be deemed that the phonemes of the two words are similar. For example, it may be deemed that the words "drive" and "trying" have similar phonemes. Thus, based on their phoneme similarity, the words "drive" and "trying" may be aligned.

The above shows a method for aligning based on phoneme similarity according to the present invention with a simple example. It is seen that the prior art method for aligning based on text matching requires a relatively high accuracy rate of the target text, otherwise the target text cannot match the reference text. The requirement of the phoneme-based method according to the present invention on accuracy of the target text is greatly lowered. As long as the phonemes of the target text are similar to the phonemes of the reference text, the alignment between the target text and the reference text can be realized, thereby improving the alignment effect. Thus, when the method according to the present invention is used to align the recognition text and the reference text of speech data, the requirement on the recognition rate of the recognition text is relatively low.

It should be understood that a more complex algorithm may be used for the phoneme similarity-based match so as to achieve a better effect. Hereinafter, an example will be described for FIG. 3, wherein a DTW algorithm is used to perform alignment based on phoneme similarity.

Next, at step S114, boundary refinement is performed. It is easily understood that after the target text and the reference text are aligned at word level, refinement may be further performed. For example, after the target text and the reference text are aligned at the word level, it is likely that most words therein are aligned while there are still a few parts which are not aligned. The unaligned parts may be redundant words (i.e., words absent in the reference text, called insertion error) or absent words in the target text (i.e., redundant words in the reference text, called deletion error). It should be understood that insertion error and deletion error are relative concepts. The redundant words in the reference text (i.e., absent words in the target text) may be called insertion error, while the absent words in the reference text (i.e., redundant words in the reference text) are called deletion error. Among the aligned words, some may be matching (identical) words, while some may be mismatching (different) words. During refinement, alignment results with higher credibility (for example matching words) may be used to refine alignment results with lower credibility (for example, insertion errors or deletion errors, even mismatching words). For an insertion error, for example, its time length may be evenly distributed to its preceding word (or words) and the following word (or words); for a deletion error, some time from its preceding and following word (or words) may be distributed to the word (s) corresponding to the deletion error.

According to the present invention, other refining operations may also be performed. For example, in the case of existence of successive insertion error words, it may be deemed that the reference text is inherently incomplete with some segments missing, or that the target text has redundant recognition of background music or noise in the media, and thus their corresponding temporal relationship may be omitted.

Through the above refinement operations, a better alignment result between the target text and the reference text may be achieved.

At step S116, a temporal link is established between the speech data and the reference text. A target text (i.e., a recognition text) obtained by performing speech recognition to a speech data typically has time information of the speech data as accompany. Through alignment of the recognition text and the reference text, the reference text may obtain time information of speech data, i.e., establishing a temporal link between the speech data and the reference text. For example, in an embodiment, each word in the recognition text of speech data has a time stamp.

A temporal link between the speech data and the reference text may be established by copying the timestamp for each word in the recognition text to each word in the reference text based on the alignment result. Further, a temporal link between the speech data and the reference text may be established by adding time information at the start of each sentence in the reference text to automatically generate a video caption document.

After a temporal link is established between the speech data and the reference document, the time of occurrence of specific content in the speech data may be directly found through the corresponding content in the reference text.

Alternatively, key content or target content in the reference text may be made with hyperlinks. By selecting a hyperlink in the reference text; the user can directly play back the content in his interest in speech data without the necessity of playing back from the start.

It should be noted that step S116 is optional. It is unnecessary to perform step 116 for only text alignment.

It should be noted that the above illustrated method is only exemplary, and the method according to the present invention is not limited to the above illustrated steps and sequence. The skilled in the art may make various changes and modifications based on the teaching of the preferred embodiment. For example, in other embodiments, some steps, for example step S114, may be omitted, or some steps may be added, for example, adding a recognition step, or the illustrated steps may be performed in other sequence, for example, step S110 may be before step S108. It should be easily understood that the illustrated steps may be performed iteratively, for example after the texts are aligned at phoneme or word level in step S112, boundaries of paragraphs may be readjusted. And then step S112 is performed again so as to achieve a better alignment result.

Figure 2:
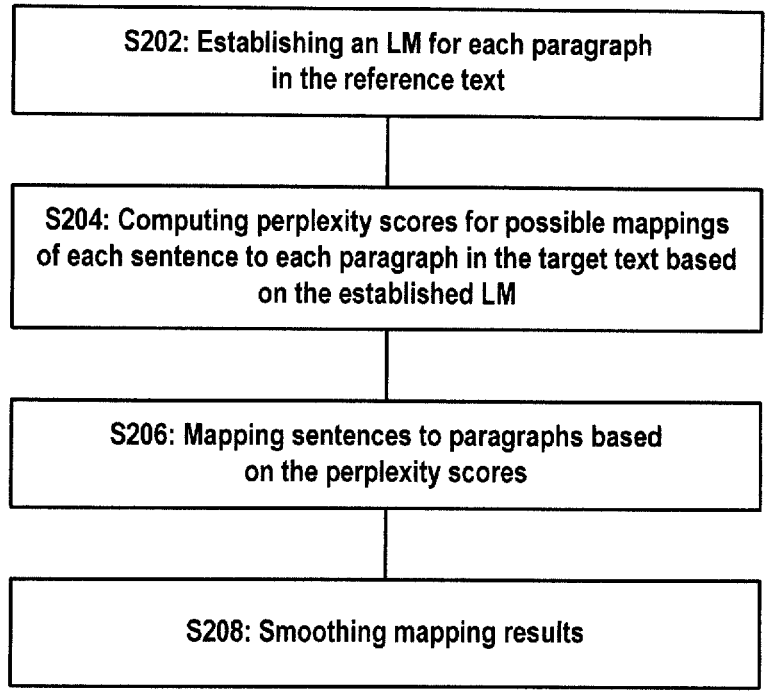
FIG. 2 schematically shows a process of aligning a target text and a reference text at paragraph level based on perplexity rules according to a preferred embodiment of the present invention.

FIG. 2 schematically shows a process of aligning a target text and a reference text at paragraph level based on perplexity rules according to a preferred embodiment of the present invention.

At step S202, a language model (LM) is established for each paragraph in the reference text. For example, it may be the known N-gram LM. At step S204, a perplexity score for possible mapping of each sentence to each paragraph in the target text is computed based on the established LM. The first sentence is first considered. If there are N paragraphs in the reference text, there may be N possible mappings. A perplexity score for each possible mapping is computed. Corresponding to a paragraph, the information entropy for each sentence may be expressed as $$H(W) = -\frac{1}{N_w}\log_2 P(W) \quad (1)$$

where P(W) expresses the probability for a given LM to be assigned to the sentence W, while $N_W$ expresses the length of the sentence with word as the unit. The perplexity score for the sentence may be expressed as $PP(X)=2^{H(X)}$, which describes how confusing the language or grammar is. For more detailed information on the concept of perplexity, refer to X. Huang, et al., "Spoken Language Processing: A Guide to Theory, Algorithm and System Development", Prentice Hall, 2001", particularly chapter 11.3 thereof. The entire content of the publication is incorporated here by reference.

Then, at step S206, a mapping result with a minimum perplexity score among the N possible mappings is selected to map the sentence to a paragraph.

Steps S204 and S206 may be performed repetitively to map a second sentence to a paragraph, and so forth, till all sentences in the target text are mapped to the corresponding paragraphs, thereby achieving alignment of the target text and the reference text at paragraph level.

Alternatively, at step S208, a mapping result from a sentence to a paragraph may be adjusted based on a logical relationship so as to achieve a final paragraph alignment result. In some cases, paragraph partition errors may exist in the paragraph alignment result as obtained at step S206. For example, the precedence relationship between sentences is inconsistent with the precedence relationship in the paragraphs to which the sentences are mapped, which thus needs smoothing. This situation may be caused likely by a sentence at the end of a paragraph being mistakenly mapped to a next paragraph or likely by a sentence at the start of a paragraph being mistakenly mapped to a preceding paragraph or even likely by two sentences respectively at the end and at the start of two sentences being mistakenly deemed as one sentence and mistakenly mapped to one paragraph thereof. Under these conditions, paragraph boundary may be redefined through smoothing so as to achieve a more accurate paragraph alignment result.

In an embodiment, smoothing may be performed based on the following two rules:

Rule 1: if in three successive sentences in a target text, sentence 1 is mapped to paragraph 1, sentence 2 is mapped to paragraph 2 and the perplexity score is low, and sentence 3 is mapped to paragraph 1, then the mapping result of sentence 2 is modified by mapping sentence 2 to paragraph 1;

Rule 2: if in three successive sentences in a target text, sentence 1 is mapped to paragraph 1, sentence 2 is mapped to paragraph 3 and the perplexity value is low, and sentence 3 is mapped to paragraph 2, then the mapping result of sentence 2 is modified by mapping sentence 2 to paragraph 2.

In another embodiment, smoothing may be performed based on the following rule:

If in three successive sentences in a target text, sentence 1 is mapped to paragraph 1, sentence 2 is mapped to paragraph 2 and the perplexity value is low, and sentence 3 is mapped to paragraph 2, then sentence 2 is mapped to paragraph 2 and paragraph 1 simultaneously. And then the paragraph boundary is redefined later based on the anchor and/or based on the phoneme similarity word-level alignment result described below.

It should be understood that at this step, any known other paragraph boundary smoothing method in the prior art may be used.

Figure 3:
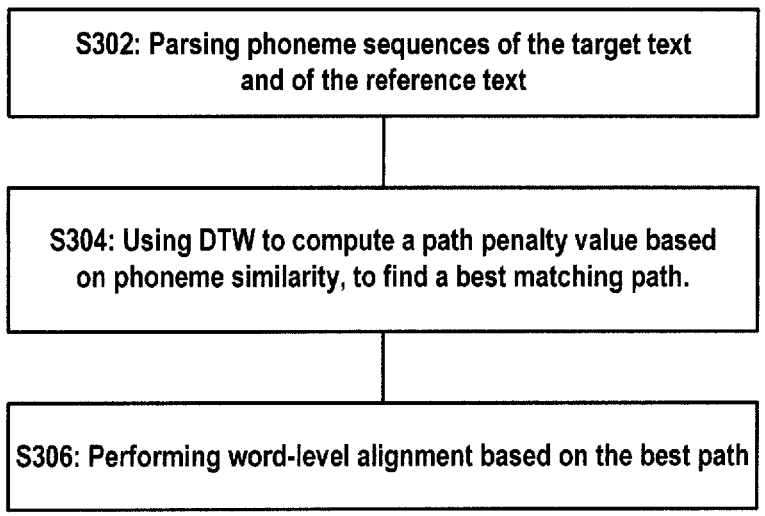
FIG. 3 schematically shows a process of aligning a target text and a reference text at word level based on phoneme similarity according to a preferred embodiment of the present invention.

Hereinafter, an embodiment of step S112 in FIG. 1 is described in detail with reference to FIG. 3. FIG. 3 schematically shows a process of aligning a target text and a reference text at word level based on phoneme similarity by using a dynamic time warping DTW algorithm. It should be understood that before performing step S112, paragraph alignment may be already performed, and/or the text has been divided into small segments based on anchors. Thus, the target text and reference text in FIG. 3 may refer to a whole text, or a paragraph, or a small segment. Usually, the smaller a segment is, the shorter is the generated phoneme sequence, and then the lower is the complexity required by performing the DTW algorithm.

At step S302, phonemes corresponding to the target text and phonemes corresponding to the reference text are parsed out. For example, each Chinese character may be split into an initial consonant part (i.e., a first phoneme) and a vowel part (i.e., a second phoneme) (for a Chinese character with dual vowels, it may be split into two parts using known corresponding technique).

For example, for the following reference text and target text:

Reference text: 印钞票还这么印，印钞票还这么印

Target text: 英超刚才，咱们说呢

The parsed phoneme sequences are as follows:
Reference text: Y IN CH AC PI AC H AI ZH E M EY IN N E ZH E
Target text: Y ING CH AC G ANG C AI Z AN M EN SHU O.

At step S304, a path penalty value is computed based on the phoneme similarity by employing the DTW algorithm, so as to find a best path matching the target text and the reference text.

Hereinafter, an embodiment of finding a best matching path with the DTW algorithm is described in detail with reference to FIG. 4a and FIG. 4b, wherein the language in use is Chinese.

FIG. 4a shows a table illustrating pronunciation similarities of words in the reference text and target text in the considered example. In the table of FIG. 4a, the reference text is put in the columns of the table and the target text is put in the rows of the table. The element a (i, j) of the table expresses the pronunciation similarity between the ith word in the target text and the jth word in the reference text.

The pronunciation similarity between words may be computed based on the phoneme similarity corresponding to the words.

The phoneme similarity between different phonemes may be predetermined. In this example, the phoneme similarity is measured based on the phoneme acoustic model distances of the phonemes, for example measured by Mahalanobis Distance. Specifically, the feature distribution of each phoneme i (for example, by the Mel Frequency Cepstral Coefficients (MFCC) is distributed as $C_i$~$N(\mu_i, \Sigma_i)$, where N is the feature dimensionality, which indicates that the probability distribution Ci of the phoneme i is governed by a Gaussian distribution with a mean vector of $\mu_i$ and a covariance matrix of $\Sigma_i$; wherein the feature dimensionality of the MFCC is N.

The Mahalanobis Distance between two phonemes i and j may be computed based on the following formula:

$$d^2(c_i, c_j) = (\mu_i - \mu_j)^T \left(\frac{\Sigma_i + \Sigma_j}{2}\right)^{-1} (\mu_i - \mu_j)$$

The phoneme similarity in the present invention may also be measured by other distances, for example Euclidean distance or Bhattacharyya distance. It is easily understood that in the case of measuring a phoneme similarity by distance, a larger value of phoneme similarity indicates a lower similarity. The phoneme similarity may also be measured by a simple two-value determination of similarity and dissimilarity, as previously described.

It should be understood that measurement of the phoneme similarity may be predetermined. In the method of the present invention, a phoneme similarity may be found simply by searching a predetermined phoneme similarity table or database.

Based on the phoneme similarity, the pronunciation similarity for any two given Chinese characters may be computed according to the following method: the sum of the similarity (distance) of the first phonemes and the similarity (distance) of the second phonemes of the two Chinese characters is just the pronunciation similarity (distance) of the two Chinese characters. Of course, a reduced average single phoneme similarity may also be used to indicate the word similarity. In other words, the pronunciation similarity between two Chinese characters may be indicated by the sum of phoneme similarities of the two Chinese characters divided by 2 (the number of phonemes). For the sake of simplicity, the sum of similarities between respective phonemes is taken as the pronunciation similarity of two Chinese characters in the present embodiment.

For example, when comparing the Chinese characters "英 (Y-ING)" and "印 (Y-IN)", the similarity between the first phonemes is 0 and the similarity between the second phonemes is 0.16 (which can be obtained through looking up the table), thus the pronunciation similarity (distance) between the two Chinese characters is 0.16. Similarly, the pronunciation similarity between "钞" and "超" is 12.19, etc.

The distance between any Chinese character and an empty syllable (silence, marked 0 in the upper left corner in the table) is a constant, for example, 8 in FIG. 4a. This constant is an empirical value and slightly lower than the average value of distances between any two Chinese characters.

For the sake of simplicity, influence of intonation on the phoneme similarity is not considered in this example. Under the teaching of this embodiment, the skilled in the art may conveniently extend the method according to the present invention to a circumstance of including intonation so as to respond to the requirement on high accuracy.

Figure 4B:
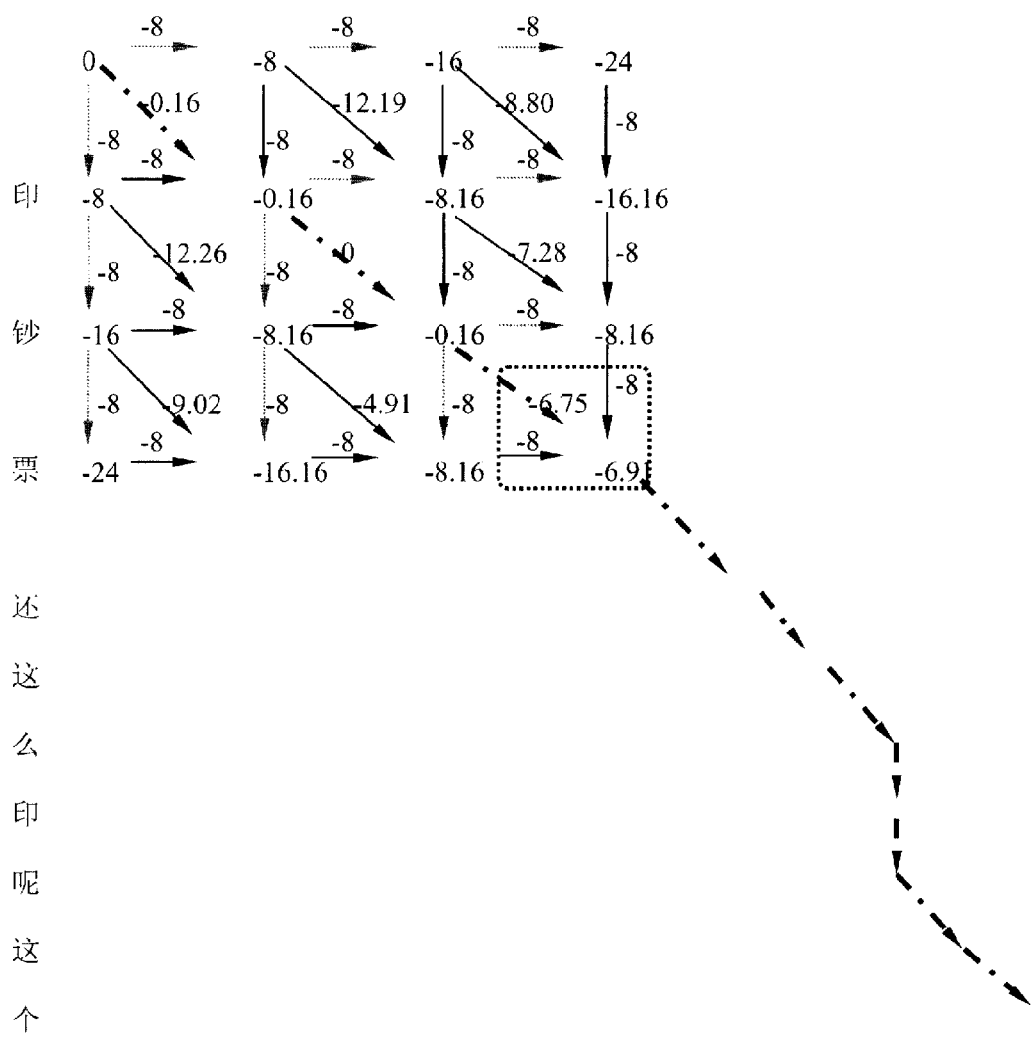
FIG. 4b shows a DTW algorithm for seeking a best matching path between a reference text and a target text according to a preferred embodiment of the present invention.

FIG. 4b shows a best matching path found according to an embodiment of the present invention in a manner of accumulative distance matrix. In the matrix of FIG. 4b, the reference text is put in the columns of the matrix and the target text is put in the rows of the matrix. An arbitrary element b (i, j) of the matrix expresses a penalty value of a best path among all possible paths reaching the location.

The value of a randomly selected matrix element b (i, j) is determined by the values of three neighboring matrix elements, i.e., the left side b (i−1, j), the upper side b (i, j−1), and the upper left b (i−1, j−1). The specific calculation method is b(i,j)=max(b(i−1,j)−8, b(i,j−1)−8, b(i−1,j−1)−a(i,j)), wherein b(i−1,j)−8, b(i,j−1)−8, and b(i−1,j−1)−a(i,j) indicate three corresponding matrix element paths, respectively vertical path, horizontal path, and slanting path, where a(i,j) is an element in the table of FIG. 4a, expressing the pronunciation similarity of two corresponding words. As shown by the sub-matrix element in the dotted-line block, the three paths are allocated in the following manner:

| | |
|---|---|
| The vertical path corresponds to: | 刚 0 |
| | 0 票 |
| The horizontal path corresponds to: | 0 刚 |
| | 票 0 |
| The slanting path corresponds to: | 超 刚 |
| | 钞 票 | wherein 0 expresses an empty syllable.

The slanting path and the vertical path express an insertion error or a deletion error, respectively. As to the insertion error or deletion error, the penalty value may be a constant, which is set as 8 in this example. The path penalty value of the slanting path corresponds to a (i, j), i.e., the corresponding pronunciation similarity of the two words. The corresponding two words in the slanting path may be identical, and then a (i, j) is 0. The corresponding two words in the slanting path may be different, which is called replacement error.

In the matrix of FIG. 4b, it is only required to provide a universal initial condition, i.e., b(0,0)=0, b(0,1)=−8, b(1,0)=−8, to compute a complete matrix with reference to the above embodiment and the pronunciation similarity in FIG. 4a.

During the process of matrix calculation in FIG. 4b, the neighboring element from which each matrix is derived (i.e., the derivative path) may be maintained while obtaining a specific value of a matrix element. In the matrix of FIG. 4b, the derivative path is marked with dotted arrow (dot dash line arrow and doted line arrow).

Usually, there are only a few paths (one path in most cases) in a matrix leading to the final element, i.e., the lower right corner element. For example, in the matrix of FIG. 4b, there is only one such path marked with a dot dash line. This path is the best matching path found. The advancing direction of the path is the best word matching manner of the corresponding reference text and the recognition text.

The principle of DTW algorithm is known in the prior art. Under the teaching of the illustrated embodiment, the skilled in the art can readily contemplate using other embodiments of the DTW algorithm to find the best matching path between the target text and the reference text.

Then, at step S306, the target text and the reference text are aligned based on the found best path. In this embodiment, the alignment result is as follows:

印 钞 票 还 这 么 印 呢 这 个
英 超 刚 才 咱 们 说 呢 wherein 0000 expresses empty syllables.

It should be understood that the steps as illustrated in FIG. 3 are only exemplary, which can also be varied. For example, in another embodiment, before step S304, whether all the phonemes in two phoneme sequences to be aligned are included in the phoneme similarity table is determined, and if any phoneme is not included therein, then the phoneme is added to the phoneme similarity table, and the distance values between the phoneme and other phonemes in the table is computed as the phoneme similarity. It should also be understood that for a best field matching path between a reference text and a recognition text, likelihood score of sentences may be obtained; and a normalized likelihood score may act as a confidence degree to further determine the sentence alignment result.

The above description illustrates a preferred embodiment of the present invention applied to the Chinese language. However, it should be understood that the alignment method according to the present invention may be applied to any language. The basis idea is to take characters or words as basic elements, and then to implement alignment between a reference text and a target text at the basic element level based on pronunciation similarity between the basic elements. The small difference lies only in calculation of the pronunciation similarity of basic elements.

For example, Chinese takes a Chinese character as a basic element. Each Chinese character includes two phonemes in an initial consonant—vowel phonetic symbol system (which can be viewed as an initial consonant part and a vowel part). Thus, similarity between Chinese characters may be expressed by the sum of initial consonant similarity and vowel similarity. However, more typically, the number of phonemes contained in basic elements in other languages may be different. For example, in English, word is taken as a basic element. Different words usually have different number of phonemes. In this case, a best phoneme matching manner between two words may be found first through the DTW algorithm, and the pronunciation similarity between the two words is calculated. For different languages, the remaining steps of the method according to the present invention are identical.

Hereinafter, another implement of step S112 is described with reference to FIGS. 5a-5d, wherein the language in use is English.

Hereinafter, a typical word similarity calculation method is described with calculation of the pronunciation similarity between "to" and "some" as an example. The word "to" includes two phonemes, marked as T and AX, respectively. The word "some" includes three phonemes, marked as S, AH and M, respectively. In the table of FIG. 5a, the phonemes included in "to" occupy the columns of the table, and the phonemes included in "some" occupy the rows of the table. The element a (i, j) in the table indicates the pronunciation similarity between the ith phoneme of "to" and the jth phoneme of "some". It should be understood that measurement of the phoneme similarity may be predetermined. In the method of the present invention, a phoneme similarity as desired may be found simply by searching a predetermined phoneme similarity table or database. In FIG. 5a, the phoneme similarity is measured by the phonemes' acoustic model distance. Moreover, in FIG. 5a, the phoneme similarity between the utterance phoneme and the empty phoneme is set as a constant value of 8. Of course, it can also be set as other constant value empirically. Likewise, for the sake of simplicity, influence of intonation on the phoneme similarity is not considered in this example. Under the teaching of this embodiment, the skilled in the art may conveniently extend the method according to the present invention to a circumstance of including intonation so as to respond to the requirement on high accuracy.

Based on the phoneme similarity in FIG. 5a, a best phoneme matching manner between the two words may be found through the DTW algorithm. The DTW algorithm is identical to that as shown in FIG. 4b, which will not be detailed here. FIG. 5b shows an accumulative distance matrix obtained through a DTW algorithm and a best matching path (indicated by arrow). An arbitrary element b (i, j) of the matrix expresses a penalty value of a best path among all possible paths reaching the corresponding location. Similar to FIG. 4b, the value of a randomly selected matrix element b (i, j) is determined by the values of three neighboring matrix elements, i.e., the left side b (i−1, j), the upper side b (i, j−1), and the upper left b (i−1, j−1). A specific calculation method is $b(i,j) = \max(b(i-1,j)-8, b(i,j-1)-8, b(i-1,j-1)-a(i,j))$, wherein $b(i-1,j)-8$, $b(i,j-1)-8$, and $b(i-1,j-1)-a(i,j)$ indicate three corresponding matrix element paths, respectively, where a(i, j) is an element in the table of FIG. 5a, expressing the pronunciation similarity of two words. It is seen that the best phoneme matching manner between "to" and "some" is as follows:

| Namely: | T | AX | 00 |
|---------|---|----|----|
|         | S | AH.| M, | wherein 00 expresses an empty syllable. By adding a corresponding empty syllable, two words which inherently have different numbers of phonemes can be regarded as having the same number of phonemes. In other words, "to" and "some" may be regarded as both having 3 phonemes.

Then, a reduced average single phoneme similarity may also be used to indicate the word similarity. For example, the word similarity between "to" and "some" is indicated by the sum of their phoneme similarities divided by the number of phonemes they contain, i.e., 14.65/3=4.88. It is easily understood that the value of the last element of the accumulative distance matrix in FIG. 5b indicates the sum of the phoneme similarities between "to" and "some", i.e., 14.65.

After obtaining the word similarity, the remaining alignment operation for a reference and a target text in English is completely identical to that in Chinese.

In the following example, the reference text is "they drive some of the core", and the target text is "they trying to some up the court".

First, the similarities between words are calculated according to the above method. FIG. 5c shows a table illustrating pronunciation similarities of words in the reference text and target text in the considered example. In the table of FIG. 5c, the reference text is put in the columns of the table and the target text is put in the rows of the table. The element c (i, j) of the table expresses the pronunciation similarity between the ith word in the target text and the jth word in the reference text.

FIG. 5d shows a best matching path for the above example found according to the present invention in a manner of accumulative distance matrix. In the matrix of FIG. 5d, the reference text is put in the columns of the matrix and the target text is put in the rows of the matrix. An arbitrary element d (i, j) of the matrix expresses a penalty value of the best path among all possible paths reaching the location. Similar to FIG. 4b, the value of a randomly selected matrix element d (i, j) is determined by the values of three neighboring matrix elements, i.e., the left side d (i−1, j), the upper side d (i, j−1), and the upper left d (i−1, j−1). A specific calculation method is d(i,j)=max(d(i−1,j)−8, d(i,j−1)−8, d(i−1,j−1)−c(i,j)), wherein d(i−1,j)−8, d(i,j−1)−8, and d(i−1,j−1)−c(i,j) indicate three corresponding matrix element paths, respectively, where c(i, j) is an element in the table of FIG. 5c, expressing the pronunciation similarity of two corresponding words. In the matrix of FIG. 5d, it is only required to provide a universal initial condition, i.e., d(0,0)=0, d(0,1)=−8, d(1,0)=−8, to compute a complete matrix with reference to the above embodiment and the pronunciation similarities in FIG. 5c.

During the process of matrix calculation in FIG. 5d, the neighboring element from which each matrix is derived (i.e., the derivative path) may be maintained while obtaining a specific value of each matrix element. Usually, there are only a few paths (one path in most cases) in a matrix leading to the final element, i.e., the lower right corner element. For example, in the matrix of FIG. 5d, there is only one such path which is marked with an arrow. This path is the found best matching path. The advancing direction of the path is the best word matching manner of the corresponding reference text and the recognition text.

Based on the best matching path in FIG. 5d, the alignment result is as follows:

| | |
|---|---|
| Reference text: | they drive 00 some of the core |
| Target text: | they trying to sum up the court. |

Figure 6:
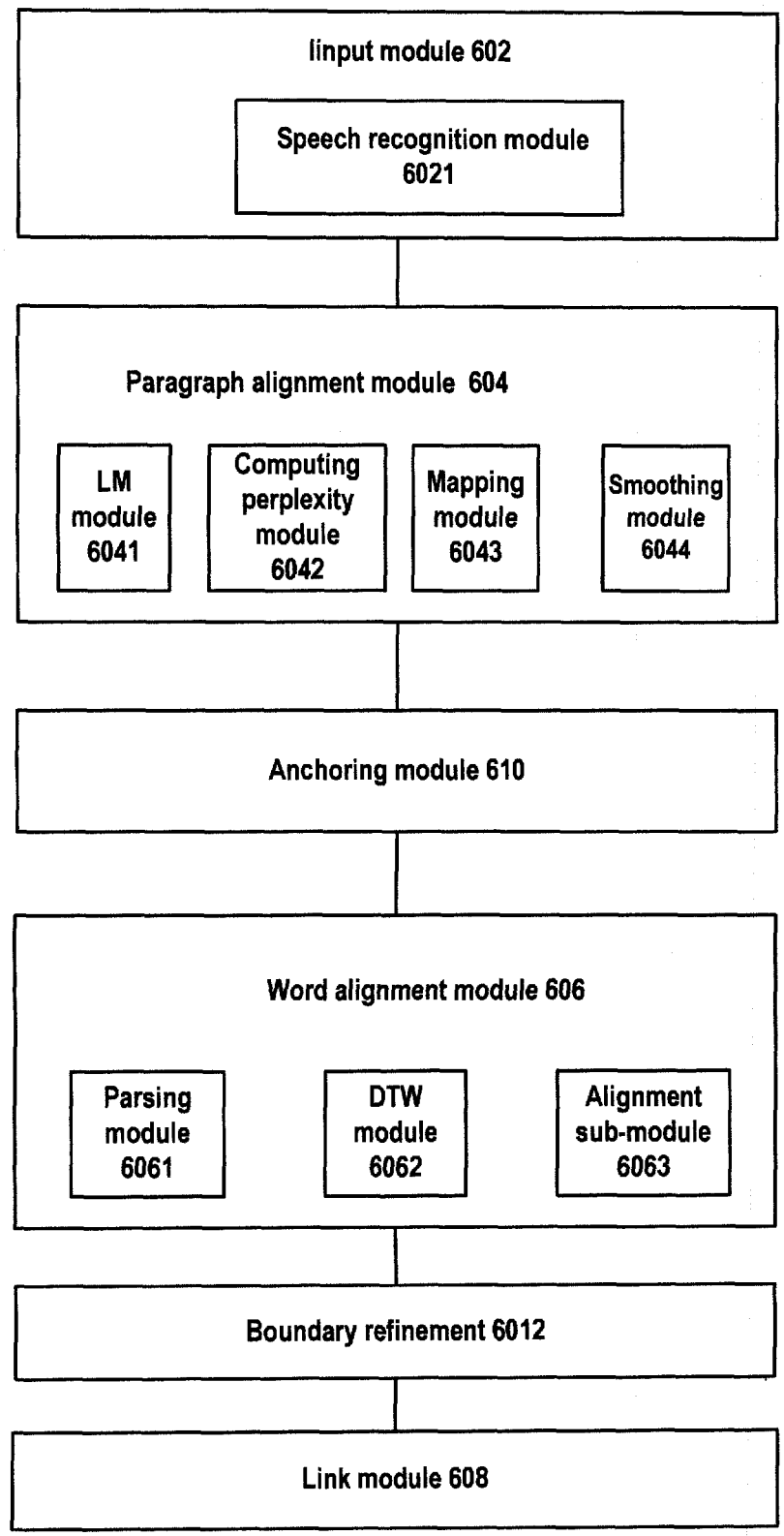
FIG. 6 schematically shows a block diagram of an apparatus for aligning texts according to a preferred embodiment of the present invention.

FIG. 6 schematically shows a block diagram of an apparatus 600 for aligning texts according to a preferred embodiment of the present invention. The apparatus 600 is for performing the method of aligning texts according to the present invention as previously mentioned. The apparatus 600 includes: input module 602, word alignment module 606, and link module 608.

The input module 602 is for acquiring a target text and a reference text. The input module 602 may directly acquire a target text and a reference text from a server or other device. Alternatively, in an embodiment of the present invention, the input module 602 further includes a speech recognition module 6021. This input module 602 may acquire a speech and a reference text from a server or other device, and then generates a target text through recognition of speech data by the speech recognition module 6021. As previously mentioned, in the present invention, the speech recognition module 6021 does not require a high recognition performance.

The word alignment module 606 is for aligning the target text and the reference text at word level based on a phoneme similarity. In this embodiment, the word alignment module 606 may include the following sub-modules: a parsing module 6061, for parsing the corresponding phonemes of the target text and the corresponding phonemes of the reference text; a DTW module 6062, which employs a DTW algorithm to calculate a path penalty value based on the phoneme similarity so as to find a best path matching the target text and the reference text; and an alignment sub-module 6063 which aligns the target text and the reference text based on the best path. It should be understood that the word alignment module 606 may have different embodiments. When a different DTW algorithm is employed to align the target text and the reference text at word level based on the phoneme similarity, the word alignment module 606 may include different sub-modules.

The link module 608 is for establishing a temporal link between the speech data and the reference text based on the alignment between the target text and the reference text. A target text (i.e., a recognition text) obtained by performing speech recognition to a speech data typically has time information of the speech data. Through alignment of the recognition text and the reference text, the reference text may obtain time information of the speech data, i.e., establishing a temporal link between the speech data and the reference text. In an embodiment, the link module 608 is for copying time stamps of respective words in the recognition text to respective words in the reference text. Alternatively, the link module 608 may make key content or target content in the reference text with hyperlinks. Through selecting a hyperlink in the reference text, the user may directly play back corresponding content in the speech data, without the necessity of playing back from the start. It should be noted that the link module 608 is not a must.

Alternatively, the apparatus 600 may include a paragraph alignment module 604 for aligning the target text and the reference text at paragraph level based on perplexity. The paragraph alignment module 604 may include: an LM module 6041 for establishing a language model LM for each paragraph in the reference text; a perplexity computing module 6042 for computing perplexity scores for possible mappings for each sentence to each paragraph in the target text based on the language models of the paragraphs; a mapping module 6043 for selecting a mapping result with a low perplexity score to map each sentence in the target text to different paragraphs.

Alternatively, the paragraph alignment module 604 further includes a smoothing module 6044, for smoothing the mapping result outputted by the mapping module 6043 based on a logical rule and adjusting a mapping relationship from a sentence to a paragraph with a low confidence degree.

Alternatively, the apparatus 600 may further include an anchoring module 610, for performing successive word string matching between the target text and the reference text so as to determine anchors. The word string matching may be performed in an order of long to short, so as to find totally matching word strings. In an embodiment, the anchoring module 610 receives a target text and a reference text from the input module 602 and outputs the target and reference texts whose anchors have been determined to the paragraph alignment module 604. In another embodiment, the anchoring module 610 receives the target text and reference text aligned at paragraph level from the paragraph alignment module 604. Successive word string matching is performed for each paragraph so as to determine the anchors. Based on the anchors, the paragraphs in the target text are segmented into smaller segments. Then, each small segment is outputted to the word alignment module 606 for processing.

Alternatively, the apparatus 600 may further include a boundary refinement module 612. The boundary refinement module 612 receives the target text and the reference text aligned at word level outputted from the word alignment module 606. The highly confident alignment results are determined in the texts, for example, aligned identical words. The determined highly confident alignment results are used to refine low confident alignment results, thereby achieving a better alignment effect. For example, the determined highly confident alignment results are used to refine insertion errors or deletion errors in the recognition.

It should be understood that the alignment method according to the present invention is not limited to aligning the recognition and reference texts of speech data. The alignment method according to the present invention may be used to align a target text and a reference text for a general purpose. For example, the alignment method according to the present invention may be used to align a dictation text of a student and a correct reference text. Then, the correct rate of the target text is evaluated in detail based on the alignment result or the path penalty value in the DTW algorithm.

By far, the technical solution of the present invention for aligning a target text and a reference text has been described by way of embodiments, wherein based on phoneme similarity, the phoneme-level alignment between a target text and a reference text is realized. Compared with the current forced alignment solution, the alignment solution of the present invention has a faster operation speed, because in the technical solution of the present invention, the phoneme similarity may be directly acquired (by pre-determining or by looking up a table), while the technical solution of forced alignment needs establishing acoustic models of phonemes, which has a heavy calculation load.

Compared with the prior art of implementing alignment through identical words, the technical solution of the present invention has a lower requirement on the accuracy rate of the target text, which permits more errors contained in the target and reference texts while achieving a better alignment result.

Additionally, the present invention also provides a hierarchical alignment solution: first aligning the target and reference texts at paragraph level based on perplexity; then, aligning at word level based on phoneme similarity. The hierarchical alignment solution of the present invention may be used to process a larger document and achieve an accurate alignment in a error tolerated manner with less calculation load.

The method for aligning a target text and a reference text according to the present invention, particularly the technical solution of automatically aligning speech data and reference text, may have a variety of applications. Hereinafter, several different applications of the present invention are described in detail.

Figure 7:
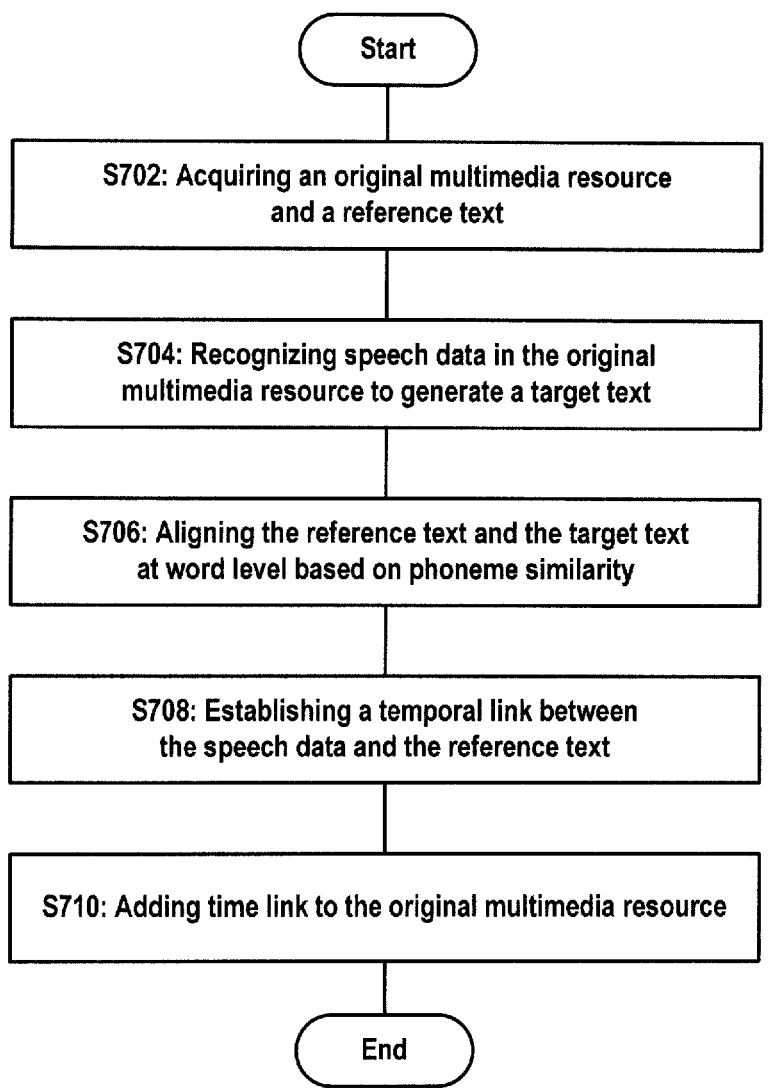
FIG. 7 schematically shows a flow chart of a method for automatically archiving a multimedia resource according to a preferred embodiment of the present invention.

FIG. 7 schematically shows a flow chart of a method for automatically archiving a multimedia resource according to a preferred embodiment of the present invention, which may be applied to automatically convert a considerable amount of news program videos and corresponding broadcast manuscripts in a television station to an integrated multimedia resource for archiving.

At step S702, an original multimedia resource and a reference document are acquired, wherein the original multimedia resource does not include metadata for searching. The original multimedia resource may be various kinds of video or audio resources, for example, it may be a movie, a TV program, a news broadcast, and video/or audio minutes of a meeting, etc.

At step S704, speech data in the original multimedia resource is recognized to generate a target text. Implementation of this step is similar to the recognition step as described in paragraphs S102 in FIG. 1. For the sake of simplicity, it will not be detailed here.

At step S706, the target text and the reference text are aligned at word level based on the phoneme similarity. Implementation of this step is similar to the paragraph S112 in FIG. 1. For the sake of simplicity, it will not be detailed here.

At step S708, a temporal link between the speech data and the reference text is established based on the alignment between the target text and the reference text. For example, by alignment between the target text and the reference text, the reference text may obtain time information of the speech data. Implementation of this step is similar to the paragraph S116 in FIG. 1. For the sake of simplicity, it will not be detailed here.

At step S710, the temporal link as established at step S708 is added to the original multimedia resource to generate a new multimedia resource file. For example, the content in the reference text with time information may be taken as meta-data of the multimedia resource so as to generate a new multimedia resource file. The new multimedia resource file has searchable metadata.

According to the method of the present invention for automatically archiving a multimedia resource, a multiple resource, for example a considerable amount of old movies, program videos, or broadcast, may be converted into a multimedia resource with searchable metadata, thereby facilitating use of such media resource.

The present invention further provides an apparatus for automatically archiving multimedia resources for implementing the above method, the apparatus includes: an input module for acquiring an original multimedia resource and a reference text; a recognition module for recognizing speech data in the original multimedia resource and generating a target text; a word alignment module for aligning the target text and the reference text at word level on the basis of phoneme similarity; a link module for establishing a temporal link between the speech data and the reference text based on alignment of the target text and the reference text; and an archiving module for adding the temporal link to the original multimedia resource to generate a new multimedia resource file.

The apparatus for automatically archiving a multimedia resource may be implemented by adding the archiving module on the basis of the apparatus 600 as shown in FIG. 6. For the sake of simplicity, it will not be detailed here.

It should be understood that the implementation of the apparatus 600 in FIG. 6 may have many variations. Thus, the apparatus of the present invention for automatically archiving a multimedia resource may also have many similar variations.

Figure 8:
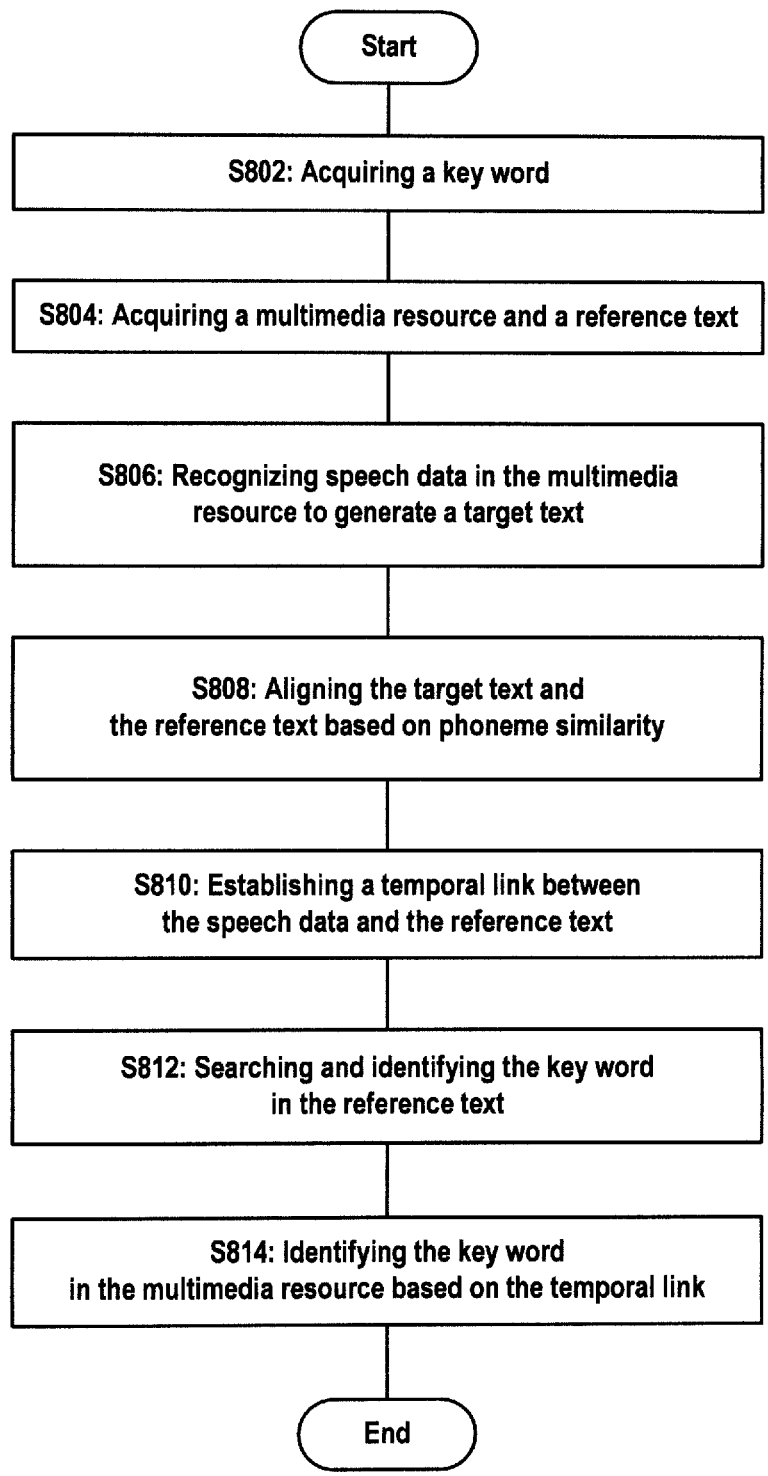
FIG. 8 schematically shows a flow chart of a method for automatically searching a multimedia resource according to a preferred embodiment of the present invention.

The technical solution of the present invention for automatically aligning speech data and reference text may also be applied to automatically searching a multimedia resource. FIG. 8 schematically shows a flow chart of a method for automatically searching a multimedia resource according to a preferred embodiment of the present invention. In this embodiment, VOA special English is taken as an example. The multimedia resource is VOA broadcast audio.

At step S802, a key word for search is acquired. In the present embodiment, an English word to be searched is input.

At step s804, a multimedia resource and a reference text are acquired. In this embodiment, the multimedia resource is VOA broadcast audio, and the reference text is the reference teaching material corresponding to the audio.

At step S806, speech data in the multimedia resource is recognized to generate a target text. Implementation of this step is identical to the recognition step as described in paragraph S102 in FIG. 1. For the sake of simplicity, it will not be detailed here.

At step S808, the target text and the reference text are aligned at word level based on the phoneme similarity. Implementation of this step is similar to the paragraph S112 in FIG. 1. For the sake of simplicity, it will not be detailed here.

At step S810, a temporal link between the speech data and the reference text is established based on the alignment between the target text and the reference text. In this embodiment, through aligning the target text and the VOA reference teaching material, the reference teaching material may obtain time information of the speech data, namely the time information of the VOA broadcast audio. Implementation of this step is similar to the paragraph S116 in FIG. 1. For the sake of simplicity, it will not be detailed here.

At step S812, the key word is searched and identified in the reference text. In this embodiment, the inputted search key word is searched and identified in the VOA teaching material.

At step S814, based on the key word retrieved in the reference text and the established temporal link, the location where the key word appears is identified in the multimedia resource. In this embodiment, the location where the inputted key word appears may be identified in the VOA broadcast audio based on the key word searched in the VOA reference teaching material and the temporal link established at step S810.

Thereby, a user (for example a learner) may directly click on a mark in a VOA broadcast audio to play back the content desired to listen, without the necessity of playing back all the audio from the start.

The present invention further provides an apparatus for automatically searching a multimedia resource for implementing the above method, wherein the multimedia resource includes speech data and a reference document thereof, the apparatus including: an input module for acquiring a key word for search, a multimedia resource and a reference document; a recognition module for recognizing the speech data in the multimedia resource and generating a target text; a word alignment module for aligning the target text and the reference text at word level based on a phoneme similarity; a link module for establishing a temporal link between the speech data and the reference document based on alignment of the target text and the reference text; a search module for searching the key word in the reference text, and an identifying module for identifying the key word in the reference text and identifying the location in the multimedia resource where the key word appears based on the key word identified in the reference text and the temporal link.

The apparatus for automatically searching a multimedia resource may be implemented by performing the following modifications on the basis of the apparatus 600 as shown in FIG. 6: modifying the input module 602 such that it is not only configured to acquire a multimedia resource and a reference text, but also configured to acquire a key word for search; and adding the above search module and identifying module. For the sake of simplicity, it will not be detailed here.

It should be understood that the implementation of the apparatus 600 in FIG. 6 may have many variations. Thus, the apparatus of the present invention for automatically searching a multimedia resource may also have many similar variations.

The technical solution of the present invention for automatically aligning speech data and a reference text may also have many applications, for example, browsing meeting video/audio minutes with a specific purpose, which will not be detailed here.

Through the above description on preferred embodiments, the skilled in the art may understand that the above apparatuses and methods may be implemented with computer-executable instructions and/or in a processor control codes, for example, such codes are provided on a carrier medium such as a magnetic disk, CD, or DVD-ROM, or a programmable memory such as a read-only memory (firmware) or a data carrier such as an optical or electronic signal carrier. The apparatus and its components in the present embodiment may be implemented by hardware circuitry of a programmable hardware device such as a very large scale integrated circuit or gate arrays, semiconductors such as logical chip or transistor, or a field-programmable gate array, or a programmable logical device, or implemented by software executed by various kinds of processors, or implemented by combination of the above hardware circuitry and software.

Though the present invention is described here through preferred embodiments, the scope of the present invention is not limited to these preferred embodiments. The scope of the present invention is defined by the appended claims and any equivalents.

What is claimed is:

1. A method for aligning texts, said method comprising:
acquiring a target text and a reference text,
said target text comprising recognized text acquired by performing speech recognition on speech data, and
said reference text being associated with said speech data; and
aligning said target text and said reference text at a word level based on phoneme similarity between phonemes in words in said target text and corresponding phonemes in corresponding words in said reference text, said aligning comprising:
parsing said phonemes of said words in said target text and said corresponding phonemes of said corresponding words in said reference text; and
computing a path penalty value by using a dynamic time warping DTW algorithm with said phoneme similarity, and finding a best path matching said target text and said reference text with said path penalty value, said aligning of said target text and said reference text being based on said best path, and
said acquiring and said aligning being performed by a programmed data processing system.

2. The method according to claim 1,
said speech data comprising any of audio data and video data acquired during an event, and
said reference text being presented during said event and comprising any of closed-captioning text and presentation materials text.

3. The method according to claim 2, further comprising establishing a temporal link between said speech data and said reference text based on alignment of said target text and said reference text.

4. The method according to claim 1, said path penalty value comprising a sum of respective penalty values for each step of a path and each penalty value for each step of said path being computed as follows:
said penalty value is 0 for same words;
said penalty value of a substitution error corresponds to a pronunciation similarity of two words, said pronunciation similarity being based on corresponding phoneme similarity; and said penalty value of any one of an insertion error and a deletion error is constant.

5. The method according to claim 1, said phoneme similarity being predetermined.

6. The method according to claim 1, said phoneme similarity being measured by acoustic model distance of phonemes.

7. The method according to claim 6, said acoustic model distance comprises one of Euclidean distance, Mahalanobis Distance, and Bhattacharyya distance.

8. The method according to claim 1, further comprising, before said aligning of said target text and said reference text at said word level, aligning said target text and said reference text at a paragraph level based on perplexity.

9. The method according to claim 8, said aligning of said target text and said reference text at said paragraph level comprising:
   establishing a language model for each paragraph in said reference text;
   computing perplexity scores for possible mappings for each sentence to each paragraph in said target text based on said language model; and
   selecting a mapping result with a low perplexity score to map each sentence in said target text to a paragraph in said target text.

10. The method according to claim 9, said aligning of said target text and said reference text at said paragraph level based on said perplexity further comprising smoothing said mapping result.

11. The method according to claim 1, further comprising, before said aligning of said target text and said reference text at said word level, performing successive word string matching between said target text and reference text to determine anchors in order to segment said target text and said reference text into smaller segments.

12. An apparatus for aligning texts, said apparatus comprising:
   an input acquiring a target text and a reference text,
      said target text comprising recognized text acquired by performing speech recognition on speech data, and
      said reference text being associated with said speech data; and
   a data processing machine operatively connected to said input and comprising a word alignment module aligning said target text and said reference text at a word level based on phoneme similarity between phonemes in words in said target text and corresponding phonemes in corresponding words in said reference text, said word alignment module comprising the following for performing said aligning of said target text and said reference text at said word level based on said phoneme similarity:
      a parsing module parsing said phonemes in said words in said target text and said corresponding phonemes in said corresponding words in said reference text;
      a dynamic time warping DTW module computing a path penalty value by using a dynamic time warping DTW algorithm with said phoneme similarity, and finding a best path matching said target text and said reference text with said path penalty value; and
      an alignment sub-module aligning said target text and said reference text based on said best path.

13. The apparatus according to claim 12,
said speech data comprising any of audio data and video data acquired during an event, and
said reference text being presented during said event and comprising any of closed-captioning text and presentation materials text.

14. The apparatus according to claim 12, said data processing machine further comprising a link module for establishing a temporal link between said speech data and said reference text based on alignment of said target text and said reference text.

15. The apparatus according to claim 12, said path penalty value comprising a sum of respective penalty values for each step of a path and each penalty value for each step of said path computed as follows:
   said penalty value is 0 for same words;
   said penalty value of a substitution error corresponds to a pronunciation similarity of two words, said pronunciation similarity being based on corresponding phoneme similarity; and
   said penalty value of any one of an insertion error and a deletion error is constant.

16. The apparatus according to claim 12, said phoneme similarity being predetermined.

17. The apparatus according to claim 12, said phoneme similarity being measured by acoustic models distance of phonemes.

18. The apparatus according to claim 17, said distance comprising one of Euclidean distance, Mahalanobis Distance, and Bhattacharyya distance.

19. The apparatus according to claim 12, said data processing machine further comprising a paragraph alignment module aligning said target text and reference text at a paragraph level based on perplexity before said aligning of said target text and said reference text at said word level.

20. The apparatus according to claim 19, said paragraph alignment module comprising the following for performing said aligning of said target text and said reference text at said paragraph level:
   a language model module for establishing a language model for each paragraph in said reference text;
   a computing perplexity module computing perplexity scores for possible mappings for each sentence to each paragraph in said target text based on said language model; and
   a mapping module selecting a mapping result with a low perplexity score to map each sentence in target text to a paragraph in said target text.

21. The apparatus according to claim 20, said paragraph alignment module further comprising a smoothing module smoothing said mapping result.

22. The apparatus according to claim 21, said data processing machine further comprising an anchor determining module performing successive word string matching between said target text and said reference text to determine anchors in order to segment said target text and said reference text into smaller segments.

23. A method for archiving a multimedia resource, said method comprising:
   acquiring an original multimedia resource and a reference text, said original multimedia resource comprising speech data and said reference text being associated with said speech data;
   recognizing said speech data to generate a target text, said recognizing comprising performing a speech recognition process on said speech data;
   aligning said target text and said reference text at a word level based on phoneme similarity between phonemes in words in said target text and corresponding phonemes in corresponding words in said reference text, said aligning comprising:

parsing said phonemes of said words in said target text and said corresponding phonemes of said corresponding words in said reference text; and computing a path penalty value by using a dynamic time warping DTW algorithm with said phoneme similarity, and finding a best path matching said target text and said reference text with said path penalty value, said aligning of said target text and said reference text being based on said best path;

establishing a temporal link between said speech data and said reference text based on alignment of said target text and said reference text; and adding said temporal link to said original multimedia resource to generate a new multimedia resource archive file, said acquiring, said recognizing, said aligning, said establishing, and said adding being performed by a programmed data processing machine.

24. A method for searching a multimedia resource, said multimedia resource comprising speech data and reference text associated with said speech data and said method comprising:

acquiring a key word for search;

acquiring a reference text and a target text, said target text comprising recognized text acquired by performing speech recognition on speech data from a multimedia resource, said reference text being associated with said speech data, said reference text and said target text being aligned at a word level based on phoneme similarity between phonemes in words in said target text and corresponding phonemes in corresponding words in said reference text, wherein alignment of said reference text and said target text having been performed by:

parsing said phonemes of said words in said target text and said corresponding phonemes of said corresponding words in said reference text;

computing a path penalty value by using a dynamic time warping DTW algorithm with said phoneme similarity, and finding a best path matching said target text and said reference text with said path penalty value; and aligning said target text and said reference text being based on said best path, and said reference text and said speech data further having an established temporal link based on the alignment;

searching for and identifying a location of said key word in said reference text; and locating a part of said multimedia resource corresponding to said key word in based on said location of said key word in said reference text and based on said temporal link;

said acquiring of said key word, said acquiring of said multimedia resource, said searching and identifying, and said locating being performed by a programmed data processing machine.

\* \* \* \* \*